A. MEPHAM.
SAW-MILL DOG.
No. 182,379. Patented Sept. 19, 1876.
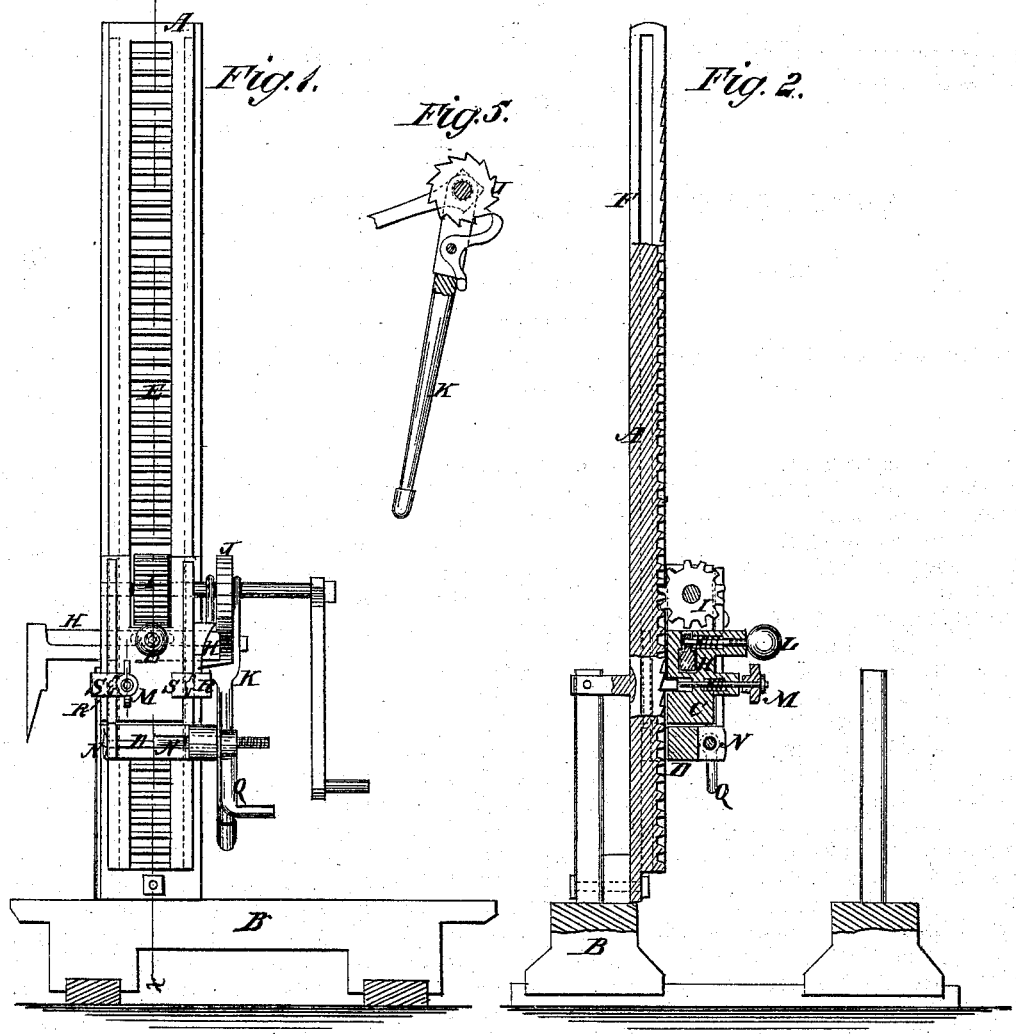
WITNESSES:
Francis McArdle,
John Goethals
INVENTOR:
A. Mepham
BY
[signature]
ATTORNEYS.

UNITED STATES PATENT OFFICE.

ALFRED MEPHAM, OF FAYETTE, OHIO.

IMPROVEMENT IN SAW-MILL DOGS.

Specification forming part of Letters Patent No. 182,379, dated September 19, 1876; application filed July 11, 1876.

*To all whom it may concern:*

Be it known that I, ALFRED MEPHAM, of of Fayette, in the county of Fulton and State of Ohio, have invented an Improvement in Saw-Mill Dogs, of which the following is a specification:

The invention consists of the dog, mounted on a block, which slides up and down on the standard, with a crank-pinion and toothed bar for working it, and a ratchet-lever for applying great force to press the dog into the log; and it also consists of a secondary plank-dog, detachably connected to the block carrying the principal log-dog, and contrived with a cranked screw-nut for drawing the plank up to the standard, in addition to the contrivance for pressing the dogs down into the timber.

Figure 1 is a side elevation of my improved mill-dog. Fig. 2 is a sectional elevation taken on the line $x\ x$ of Fig. 1. Fig. 3 is a horizontal section through the standard, showing a top view of the plank-dog. Fig. 4 is a side elevation of a portion of the block carrying the dogs, and Fig. 5 is a detail of the ratchet contrivance.

Similar letters of reference indicate corresponding parts.

A is the standard, rising up from the head-block B, for the support of the dog-carrying blocks C D, and for the log-support, in which standard is a toothed rack, E, and guides F for the lugs G, by which the blocks are secured to it.

The block C carries the log-dog H and the cranked pinion I, the dog being to fasten the log, and the pinion being to slide the dog up and down on the standard by gearing with the teeth of rack E of the standard.

The shaft of the pinion has a ratchet-wheel, J, with which a lever, K, is made to work when it is required to employ great force to press the dog into the log.

The dog is made to slide out and in the block, to adjust it toward and from the standard; and there is a spring stop-pin, L, to fasten it. There is also a spring stop-pin, M, in the block C, to engage with the teeth E, to prevent the block from falling down when not held up by one of the dogs on the log. This pin is beveled on the upper side, so that it does not interfere with the raising of the dog-block by the crank.

N represents the plank-dog, which is fitted in the bars O, connected to block D and also to block C, so that it can be drawn powerfully toward the standard A by the cranked nut Q after being pressed down into the plank.

The bars O P shift up and down in the studs R on the block C, to adjust the plank-dog relative to the log-dog, and are fastened by the set-screws S. The bar P is permanently fastened to the block D, and connects it with C, so as to be raised and lowered by it; but the other merely connects in a groove at T, allowing it to be driven down by striking it on the upper end to force the dog into the plank.

The plank-dog and its carrying-block may be taken off from the standard when not required for use.

Having thus described my invention, I claim as new and desire to secure by Letters Patent—

1. The block C, adjustable log-dog H, cranked pinion I, ratchet-lever K, ratchet-wheel J, and toothed standard A, combined and arranged substantially as specified.

2. The block D, adjustable plank-dog N, and bars O P, combined with the block C and standard A, substantially as specified.

ALFRED MEPHAM.

Witnesses:
W. C. KELLEY,
JOHN C. RORICK.